United States Patent [19]

McDonald

[11] Patent Number: 5,197,816
[45] Date of Patent: Mar. 30, 1993

[54] LOCKING DOUBLE U-JOINT ASSEMBLY
[75] Inventor: Larry E. McDonald, Houston, Tex.
[73] Assignee: Tuboscope Vetco International, Inc., Houston, Tex.
[21] Appl. No.: 925,921
[22] Filed: Aug. 7, 1992
[51] Int. Cl.⁵ .............................................. F16D 1/00
[52] U.S. Cl. ...................................... 403/24; 403/57; 464/119
[58] Field of Search ............................ 403/57, 74, 24; 464/115, 117, 119

[56] References Cited
U.S. PATENT DOCUMENTS
4,480,495 11/1984 Obama ............................... 403/74 X
4,914,973 4/1990 Bailey et al. ......................... 464/119

FOREIGN PATENT DOCUMENTS
2344905 3/1975 Fed. Rep. of Germany ........ 403/57

Primary Examiner—Andrew V. Kundrat
Attorney, Agent, or Firm—Finnegan, Henderson, Farabow, Garrett & Dunner

[57] ABSTRACT

A flexible double U-joint assembly that includes structure for locking the assembly in a single U-joint mode to permit easy insertion into a pipeline with an associated inspection device. When in the pipeline, the assembly may be converted to a double U-joint mode by applying tension to the device.

11 Claims, 2 Drawing Sheets

LOCKING DOUBLE U-JOINT ASSEMBLY

BACKGROUND OF THE INVENTION

1. Field of the Invention

The invention relates to a flexible double U-joint which is particularly adapted for use in the in-line inspection of pipelines.

2. Description of the Prior Art

With oil and gas line installations, it is customary both incident to the on-site construction thereof and periodically during the life of the pipeline to conduct an internal inspection to determine the extent of corrosion or damage. For this purpose devices such as TV cameras and ultrasonic inspection devices, along with other inspection equipment well known in the art, are inserted into the pipeline and moved along the length thereof to achieve the desired inspection.

Incident to these inspection operations, the pipeline inspection device must be inserted into the pipeline by moving it into a pipe somewhat larger in inside diameter than the outside diameter of the inspection device. It is customary to force the device into the pipeline by pushing it from the rear. Customarily, these inspection devices consist of from three to eight sections connected together by universal joints to allow the device to negotiate bends in the pipeline. To negotiate very sharp bends, simple universal joints are replaced by double U-joints. Although single U-joints are semirigid and thus can be pushed without buckling or bending in a pipeline, double U-joints, on the other hand, have no rigidity and thus cannot be pushed into the pipeline. Consequently, it is necessary to pull these devices into the pipeline. This is difficult to accomplish as the means for connecting the device to the arrangement exterior of the pipe to achieve this pulling action is cumbersome, since it is required that the connection extend through a reclosable opening a short distance downstream from the entrance opening to permit the required pulling action.

OBJECTS OF THE INVENTION

It is accordingly a primary object of the present invention to provide a flexible double U-joint assembly that may be readily converted from a single to a double U-joint device.

A more particular object of the invention is to provide a flexible double U-joint assembly that may be converted from a single to a double U-joint device by placing the device in axial tension.

SUMMARY OF THE INVENTION

The flexible double U-joint of the invention comprises two opposed locking members that are mounted in spaced-apart relation. Extension spring means are connected to and between these locking members to normally urge them along an axis thereof towards each other. Two opposed connectors are provided and are adapted for axial movement normal to the axis of the locking members. These connectors have means for permitting individual rotation thereof about a first axis along a plane normal to a plane of the axis of the locking members, and about a second axis along a plane coextensive with a plane of the axis of the locking members. Each of the connectors has engaging means for selectively engaging the locking members to move the locking members against the normal urging of the extension spring means and away from each other along the axis thereof to a first position, when the engaging means are in engagement with the locking members, and to permit said locking members to move toward each other along the axis thereof to a second position when the engaging means are out of engagement with the locking members. Means are provided for preventing the rotation of the connectors about the second axis when the locking members are in the first position thereof, and for permitting rotation of the connectors about the second axis when the locking members are in the second position thereof.

The extension spring means may include at least one spring connected to and between opposed inner surfaces of the locking members. The extension spring means may include at least one helical spring having opposite ends thereof connected to and extending between the opposed inner surfaces of the locking members.

Each of the connectors may be rotatably connected to a first pivot pin for permitting the rotation thereof about the first axis and to a second pivot pin for permitting the rotation thereof about the second axis.

The means for preventing the rotation of the connectors about the second axis when the locking members are in the first position thereof may include a tongue portion provided on each of opposed ends of the connectors for selective insertion into a slot provided in a spring housing for the extension spring means.

The engaging means may include opposite end portions of the first pivot pin with these portions being adapted to selectively engage opposed inner end portions of the locking members.

The connectors may each have means connecting the joint to an assembly for rotation with the connectors. The connectors may each have means connecting the joint to a pipeline inspection device for rotation with the connectors.

The spring housing and the locking members may each have services adapted for engagement when the locking members are in the second position.

DESCRIPTION OF THE PREFERRED EMBODIMENT

Figure 1:
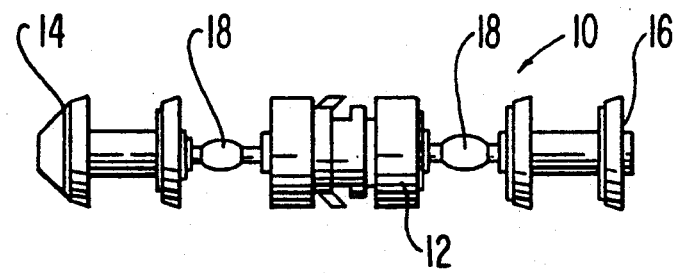
FIG. 1 is an elevation view of an embodiment of the flexible double U-joint assembly of the invention connected to a pipeline inspection device.

With reference to the drawings, and for the present to FIG. 1 thereof, there is shown an assembly of apparatus for inspection of a pipeline with this assembly designated generally as 10. The assembly includes a pipeline inspection device 12, which may be any conventional device such as an ultrasonic inspection unit. The particular pipeline inspection device employed with the flexible joint of the invention may constitute any suitable device well known in the art for this purpose and does not constitute a part of the invention. On opposite ends of the assembly 10 are a forward guide 14 and a rear guide 16. The flexible joints, each of which are in accordance with the invention are designated generally as 18 and are connected between the guide 14 and the inspection device 12 and the guide 16 and the inspection device 12.

Figure 2A:
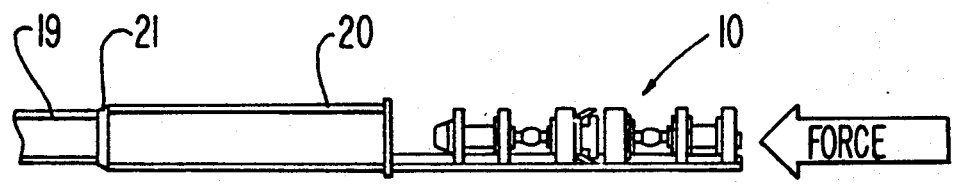
FIG. 2A is an elevational view of the assembly of FIG. 1 positioned for insertion into a pipeline.
Figure 2B:
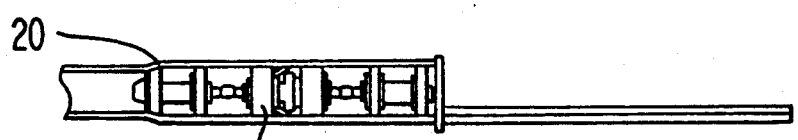
FIG. 2B is a similar view showing the device inserted into a pipeline.

As shown in FIGS. 2A and 2B, the assembly 10 is positioned axially with respect a pipeline 19 having an oversize portion 20, which is the position shown in FIG. 2A. It is then pushed into the oversize portion 20 until the forward guide engages the pipeline swage 21.

Figure 3:
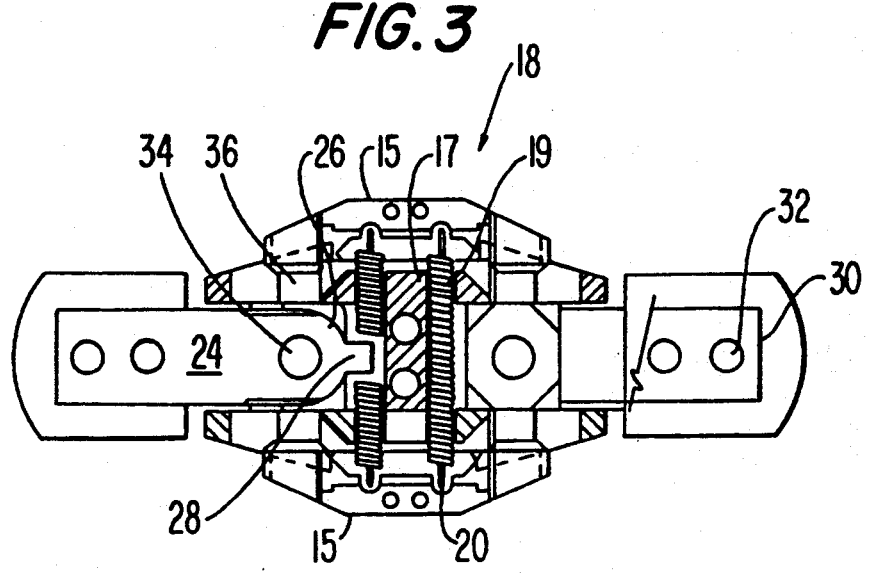
FIG. 3 is an assembly view in vertical cross-section of an embodiment of a flexible double U-joint in accordance with the invention with the device being in a single U-joint position.
Figure 4:
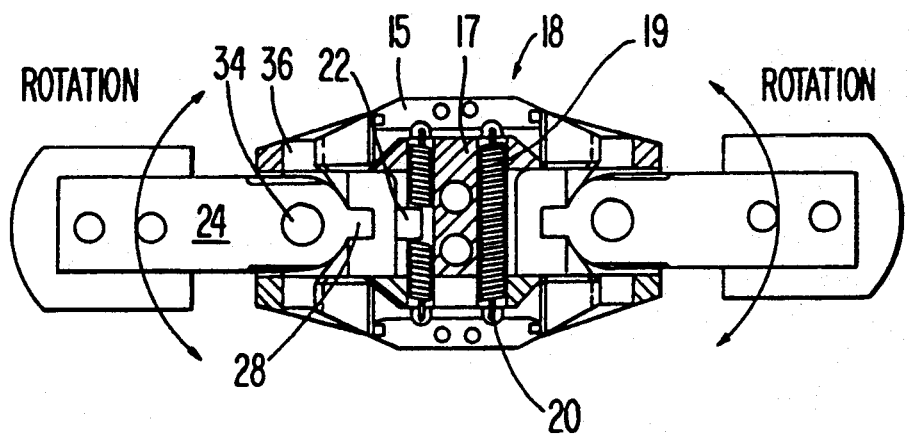
FIG. 4 is a view similar to FIG. 3 with the joint of the invention being in a double U-joint position.
Figure 5:
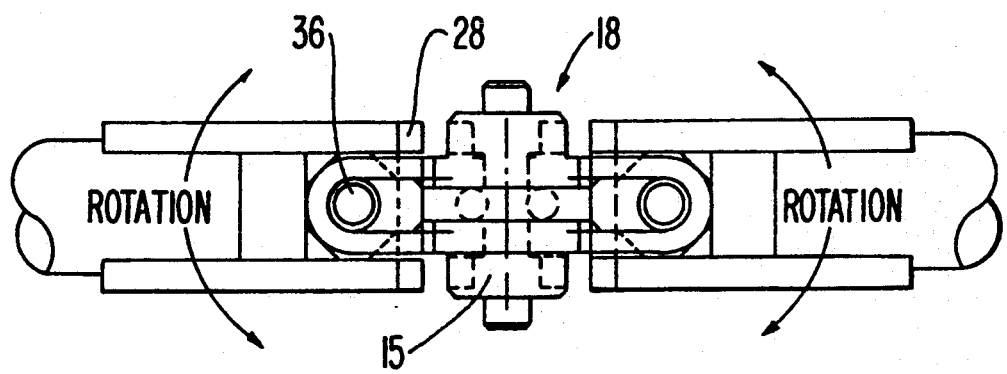
FIG. 5 is a plan view of the device as shown in FIG. 4.

As shown in FIGS. 3, 4 and 5 the flexible joint 12 in accordance with this embodiment of the invention includes a pair of opposed locking members 15. The locking members 15 are connected to a pair of extension springs 19. The springs 19 extend within spring housing 17. The ends of the springs 19 are connected to the locking members at connectors 20. The spring housing is provided with a pair of opposed slots 22. Two opposed connectors 24 are provided having opposed inner ends 26 having tongues 28. Opposite ends 30 of connectors 24 are provided with bolt holes 32 for use in connecting the flexible joint 12 in an assembly, as shown in FIG. 1.

The connectors 24 are journaled for rotation on pivot pins 34 and 36. Pivot pins 34 and 36 are positioned with their axes in opposed relation. In this manner, the joint of the invention provides for selective rotation of the connectors 24 about axes normal to each other.

FIG. 3 shows the flexible joint of the invention in position for insertion into the pipeline. In this position, the connectors 24 are positioned with the tongues 28 thereof being within the slot 22 and with the opposed ends of the pivot pin 36 engaging opposed inner surfaces of the locking members 15 to move the locking members axially away from each other and against the urging of the springs 16. In this position, as shown in FIG. 3, the engagement of tongues 28 within slots 22 and the engagement of pivot pins 36 with the opposed inner surfaces of the locking members 14, rotation of the connectors 24 about the pivot pins 34 is prevented. Consequently, the connectors 24 can only rotate about the pivot pins 36. With the flexible joint in this position, insertion into the pipeline is facilitated by the fact that rotation about a single plane is permitted and thus the joint of the invention constitutes a single U-joint structure. When tension is applied to the opposed connectors 24 they are moved to the positions shown in FIGS. 4 and 5. Specifically, as best shown in FIG. 4, the tongues 28 of the connectors 24 are removed from the slots 22, and the pivot pins 36 are moved out of engagement with the locking members 14. This permits the locking members by the action of springs 16 to move toward each other to the position shown in FIG. 4. In this position, the connectors 24 are free to rotate about the axis of pivot pin 34 as well as about the axis of pivot pin 36. Consequently, with the structure of the flexible joint being as shown in FIG. 4, it becomes a double U-joint device. This permits beneficial negotiation of severe bends in the pipeline during inspection. When tension is applied to the connectors 24 to place the device in the position shown in FIG. 4 it will remain so until removed from the pipeline and manually reset to the position shown in FIG. 3.

It may been seen from the above, that in accordance with the invention the flexible joint may be made relatively more rigid to facilitate insertion initially into the pipeline and then by the application of tension made more flexible to desirably permit negotiation of difficult bends in the pipeline during inspection.

We claim:

1. A flexible double U-joint comprising two opposed locking members mounted in spaced-apart relation, extension spring means connected to and between said locking members and normally urging said locking members along an axis thereof toward each other, two opposed connectors adapted for axial movement normal to said axis of said locking members, said connectors having means for permitting individual rotation thereof about a first axis along a plane normal to a plane of said axis of said locking members and about a second axis along a plane coextensive with a plane of said axis of said locking members, each of said connectors having engaging means for selectively engaging said locking members to move said locking members against said normal urging of said extension spring means and away from each other along said axis thereof to a first position when said engaging means are in engagement with said locking members and to permit said locking members to move toward each other along said axis thereof to a second position when said engaging means are out of engagement with said locking members, and means for preventing said rotation of said connectors about said second axis when said locking members are in said first position thereof and for permitting rotation of said connectors about said second axis when said locking members are in said second position thereof.

2. The joint of claim 1, wherein said extension spring means includes at least one spring connected to and between opposed inner surfaces of said locking members.

3. The joint of claim 1, wherein said extension spring means includes at least one helical spring having opposite ends thereof connected to and between opposed inner surfaces of said locking members.

4. The joint of claim 1, wherein each of said connectors is rotatable connected to a first pivot pin for permitting said rotation thereof about said first axis and to a second pivot pin for permitting said rotation thereof about said second axis.

5. The joint of claim 4, wherein said preventing means includes a tongue portion provided on each of opposed ends of said connectors for selective insertion into a slot provided in a spring housing for said extension spring means.

6. The joint of claim 4 wherein said engaging means includes opposite end portions of said first pivot pin adapted to selectively engage opposed inner end portions of said locking members.

7. The joint of claim 5 wherein said engaging means includes opposite end portions of said first pivot pin adapted to selectively engage opposed inner end portions of said locking members.

8. The joint of claim 1, wherein said connectors each have means connecting said joint to an assembly for rotation with said connectors.

9. The joint of claim 1, wherein said connectors each have means connecting said joint to a pipeline inspection device for rotation with said connectors.

10. The joint of claim 6, wherein said spring housing and said locking members each have surfaces adapted for engagement when said locking members are in said second position.

11. The joint of claim 7, wherein said spring housing and said locking members each have surfaces adapted for engagement when said locking members are in said second position.

* * * * *